United States Patent
Couasnon

(10) Patent No.: US 11,214,175 B2
(45) Date of Patent: Jan. 4, 2022

(54) SYSTEM COMPRISING A VEHICLE SEAT TRACK AND A SUPPORT

(71) Applicant: FAURECIA Sièges d'Automobile, Nanterre (FR)

(72) Inventor: Christian Couasnon, Flers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 16/906,064

(22) Filed: Jun. 19, 2020

(65) Prior Publication Data
US 2020/0398703 A1 Dec. 24, 2020

(30) Foreign Application Priority Data
Jun. 21, 2019 (FR) ...................................... 1906705

(51) Int. Cl.
*B60N 2/07* (2006.01)
*B60N 2/075* (2006.01)

(52) U.S. Cl.
CPC ......... *B60N 2/0705* (2013.01); *B60N 2/0722* (2013.01); *B60N 2/075* (2013.01)

(58) Field of Classification Search
CPC .... B60N 2/0705; B60N 2/0722; B60N 2/075; B60N 2/0732; B60N 2/08
USPC ..... 296/65.13, 14; 248/429, 430; 280/201.1, 280/0.2, 804, 805
See application file for complete search history.

(56) References Cited

U.S. PATENT DOCUMENTS

| 4,676,556 A * | 6/1987 | Yamanoi ................. B60R 22/26 297/216.1 |
| 4,824,175 A * | 4/1989 | Tokugawa .............. B60R 22/26 248/548 |
| 5,031,961 A * | 7/1991 | Isern ....................... B60R 22/04 297/473 |
| 6,152,415 A * | 11/2000 | Seki ....................... B60N 2/071 248/430 |
| 2006/0061196 A1* | 3/2006 | Rausch ................ B60N 2/0715 297/463.1 |
| 2008/0048086 A1* | 2/2008 | Kojima ................... B60R 22/26 248/429 |
| 2012/0128411 A1 | 5/2012 | Kneif |
| 2016/0144746 A1* | 5/2016 | Couasnon ............ B60N 2/0705 384/34 |
| 2017/0197525 A1* | 7/2017 | Hattori ................... B60N 2/073 |

FOREIGN PATENT DOCUMENTS

| FR | 2967734 A1 | 5/2012 |
| FR | 2981617 B1 | 4/2013 |
| FR | 3028812 A1 | 5/2016 |
| FR | 3075120 A1 | 6/2019 |
| JP | 62018348 A * | 1/1987 ........... B60N 2/0715 |

* cited by examiner

*Primary Examiner* — Dennis H Pedder
(74) *Attorney, Agent, or Firm* — Barnes & Thornburg LLP

(57) ABSTRACT

A system comprising a vehicle seat track, in particular automotive vehicle, and a support, where the track comprises a fixed profile intended to be added onto the chassis of the vehicle and a mobile profile configured for sliding relative to the fixed profile. The support comprises an engaging part forming a hook, where the engaging part is configured for engaging with the mobile profile in case of impact of the vehicle.

18 Claims, 8 Drawing Sheets ures in which:

SYSTEM COMPRISING A VEHICLE SEAT TRACK AND A SUPPORT

PRIORITY CLAIM

This application claims priority to French Patent Application No. FR 19 06705, filed Jun. 21, 2019, which is expressly incorporated by reference herein.

BACKGROUND

The present disclosure relates to systems comprising an automotive vehicle seat track and a support intended to be fixed thereto.

SUMMARY

According to the present disclosure, a system comprises a vehicle seat track, in particular an automotive vehicle, and a support, where the track comprises:
- a fixed profile intended to be added onto the chassis of the vehicle; and
- a mobile profile configured for sliding relative to the fixed profile along a longitudinal direction, where the mobile profile has a main surface extending along a transverse direction between two lateral wings, the transverse direction is perpendicular to the longitudinal direction, the lateral wings each extend in a vertical plane perpendicular to the transverse direction, the support comprises an engaging part forming a hook, and the engaging part is configured for engaging with the mobile profile in case of impact of the vehicle.

In illustrative embodiments, a system results providing better safety if a force is exerted by the equipment on the support in case of collision of the vehicle.

In illustrative embodiments, the system does not require additional parts or elements as compared to other comparative system while minimizing changes to the associated production method either.

In illustrative embodiments, the mobile profile and the fixed profile each extends between a first end and a second end, and the hook forming mobile part is configured for engaging with the end of the mobile profile, made up of the first end or the second end.

In illustrative embodiments, the end of the mobile profile held is the end of the mobile profile pointing towards the rear of the seat, specifically pointing towards the direction opposite the direction of movement of the automotive vehicle, and in particular such that the holding part engages with the end of the mobile profile in case of frontal impact.

In illustrative embodiments, the support comprises a holding part coming into contact with the main surface of the mobile profile.

In illustrative embodiments, the engaging part and the holding part are arranged, at least partially, on each side of the main surface of the mobile profile.

In illustrative embodiments, the holding part is fixed by at least one weld to the main surface of the mobile profile.

In illustrative embodiments, the engaging part comprises an end part fixed by at least one weld to one of the lateral wings of the mobile profile.

In illustrative embodiments, the end part comprises a fold.

In illustrative embodiments, the end part comprises a projecting wing received in a slot of the lateral wing to which the end part is fixed by welding.

In illustrative embodiments, the engaging part extends in a horizontal plane perpendicular to the vertical direction.

In illustrative embodiments, the engaging part has a hook shape in the horizontal plane comprising:
- a first part extending substantially in the transverse direction, where the first part is located, along the longitudinal direction, cantilevered relative to the end of the mobile profile configured for engaging with the engaging part; and
- a second part, connected to the first part, extending substantially in the longitudinal direction, located underneath the main surface of the mobile profile.

In illustrative embodiments, one end of the mobile profile comprises a slot, where the slot is configured for allowing the engaging part to deform in case of impact of the vehicle. This slot can be made on the main surface of the mobile profile.

In illustrative embodiments, the support comprises two lateral wings allowing the attachment of one or more pieces of equipment for the seat, where the two lateral wings are offset along the longitudinal direction and/or the transverse direction relative to the end of the mobile profile.

In illustrative embodiments, the two lateral wings may be offset along the longitudinal direction, including a first wing positioned, along the longitudinal direction, covering the mobile profile and a second wing, positioned, along the longitudinal direction, cantilevered relative to the end of the mobile profile configured for engaging with the holding part.

In illustrative embodiments, the present disclosure also relates to a seat comprising the system.

In illustrative embodiments, the first wing comprises a hole configured for fixing the seat cushion of the seat, the second wing, cantilevered, comprises a hole configured for fixing the end of a seatbelt, therefore notably located cantilevered, along the longitudinal direction relative to the end of the mobile profile configured for engaging with the holding part.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

It should be noted that, on the figures, the structural and/or functional elements common to the various embodiments can have the same references. In that way, unless indicated otherwise, such elements have identical structural, dimensional and material properties.

Unless specified otherwise, the expressions "approximately," "substantially," "about," "of the order of," etc. indicate that a small variation from the nominal value considered is possible, such as a small percentage, in particular within 10%.

In the following description, the terms "front" and "rear" and their synonyms are understood as referring to the front and rear of the vehicle in its usual position.

The terms "top," "bottom," "upper" and "lower" and their synonyms are defined relative to the seat in the usual horizontal position thereof.

Figure 1:
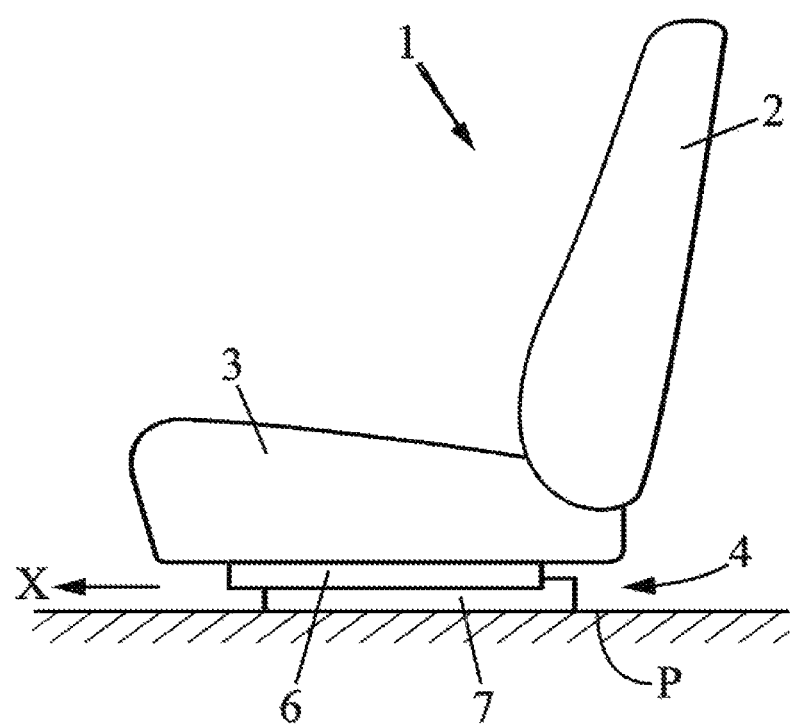
FIG. 1 is a schematic view of a side of an automotive vehicle seat.

FIG. 1 schematically shows an automotive vehicle seat 1 comprising a seatback 2 and a seat cushion 3. The seatback 2 can be mounted on the seat cushion 3.

The seat cushion 3 is added onto the floor P of a chassis of the vehicle by means of one or more tracks 4, for example two tracks, extending respectively along a longitudinal direction X.

Further, a transverse direction Y is defined as being perpendicular to the longitudinal direction X.

More specifically, the transverse direction Y and the longitudinal direction X can for example substantially belong to the horizontal plane of extension XY of the floor P of the vehicle.

The direction Z corresponds in turn to a vertical direction.

Note that the present disclosure is described in operating position in the vehicle.

The tracks 4 comprise a fixed profile 7 which is added, generally fixed, onto the chassis of the vehicle and a mobile profile 6 to which the seat cushion 3 of the seat 1 is fixed by means detailed below.

The fixed profile 7 and the mobile profile 6 have complementary shapes allowing the mobile profile 6 to slide along the longitudinal direction X relative to the fixed profile 7, so as to adjust the longitudinal position of the seat 1 in the vehicle passenger compartment.

The seat cushion 3 generally has a rigid metal frame (not shown) comprising two lateral rods extending in the longitudinal direction X added onto the mobile profile 6. The seat 3 is thus fixed onto the floor P of the vehicle by the tracks 4.

The fixed profile 7 has a substantially U-shaped section.

The mobile profile 6 has a substantially inverted U-shaped section, such that the mobile profile 6 is nested in the fixed profile 7 and can slide along the fixed profile 7 in the longitudinal direction X.

Each profile 6, 7 extends respectively along the longitudinal direction X between a first end 6a, 7a and a second end 6b, 7b.

Figure 2:
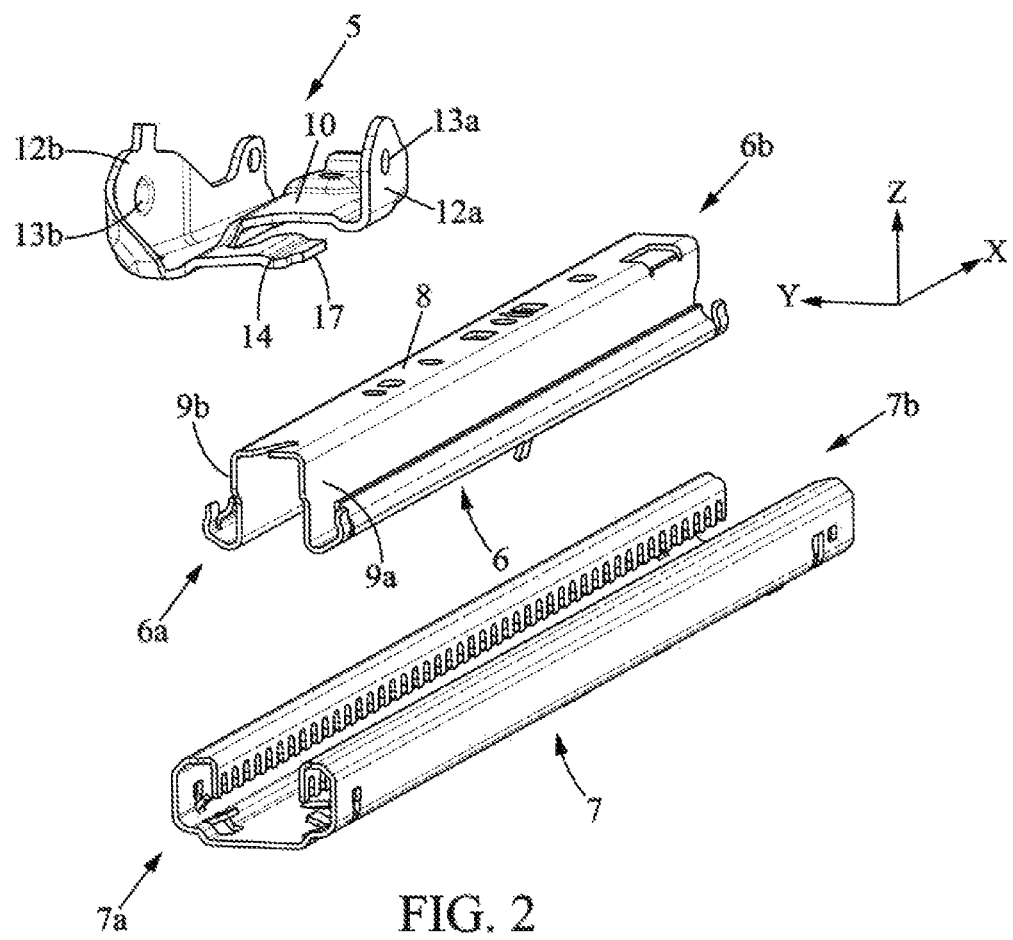
FIG. 2 is a perspective exploded view of the system according to the present disclosure.

As specifically visible on FIG. 2, the longest extension of the mobile profile 6 is along the longitudinal direction X and the mobile profile 6 comprises a main surface 8 extending in a transverse direction Y between two lateral wings 9a, 9b.

The main surface 8 extends for example along the horizontal plane XY, perpendicular to the vertical direction Z.

The two lateral wings 9a, 9b of the mobile profile 6 are arranged facing each other relative to the main surface 8 along the transverse direction Y.

The two lateral wings 9a, 9b are preferably substantially parallel to each other.

The two lateral wings 9a, 9b each extend in a vertical plane XZ perpendicular to the transverse direction Y.

Because of the lateral wings 9a, 9b, the nesting, hold and good sliding of the profiles 6 and 7 against each other can be assured.

The profiles 6, 7 are each for example made by folding a single sheet.

Figure 3:
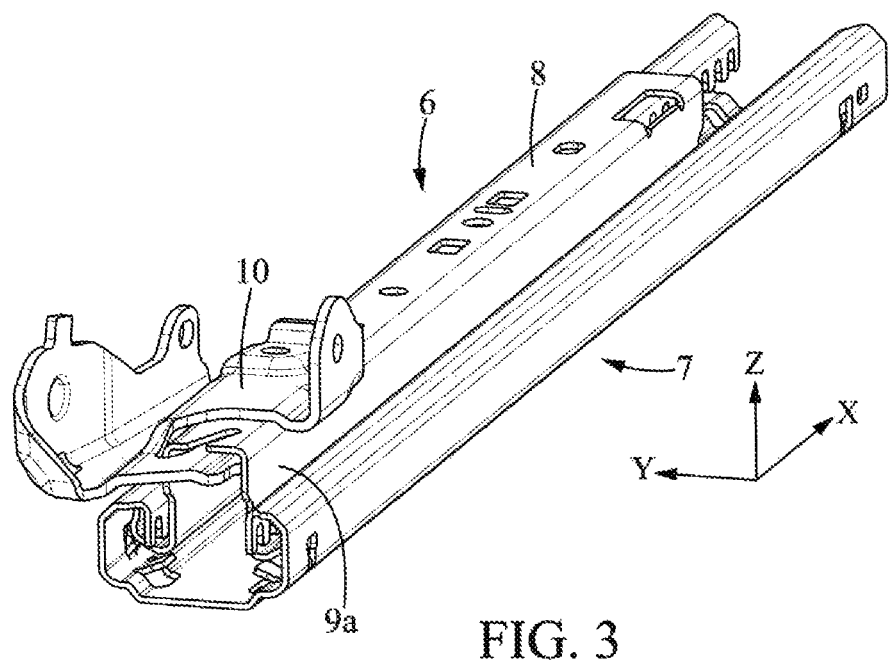
FIG. 3 is a perspective assembled view of the system from the FIG. 2.

As can be seen in FIG. 3, the system according to the present disclosure comprises a support 5 placed on top of the mobile profile 6 in the vertical direction Z.

The support 5 comprises a holding part 10, in contact with the main surface 8 of the mobile profile 6.

Thus the holding part 10 extends for example along the horizontal plane XY, perpendicular to the vertical direction Z. The holding part is at least partially flat in the horizontal plane XY.

The holding part 10 of the support 5 is connected, in particular is fixed, to the mobile profile 6. The holding part 10 is then in direct contact, in particular by the surface, with the mobile profile 6.

Figure 4A:
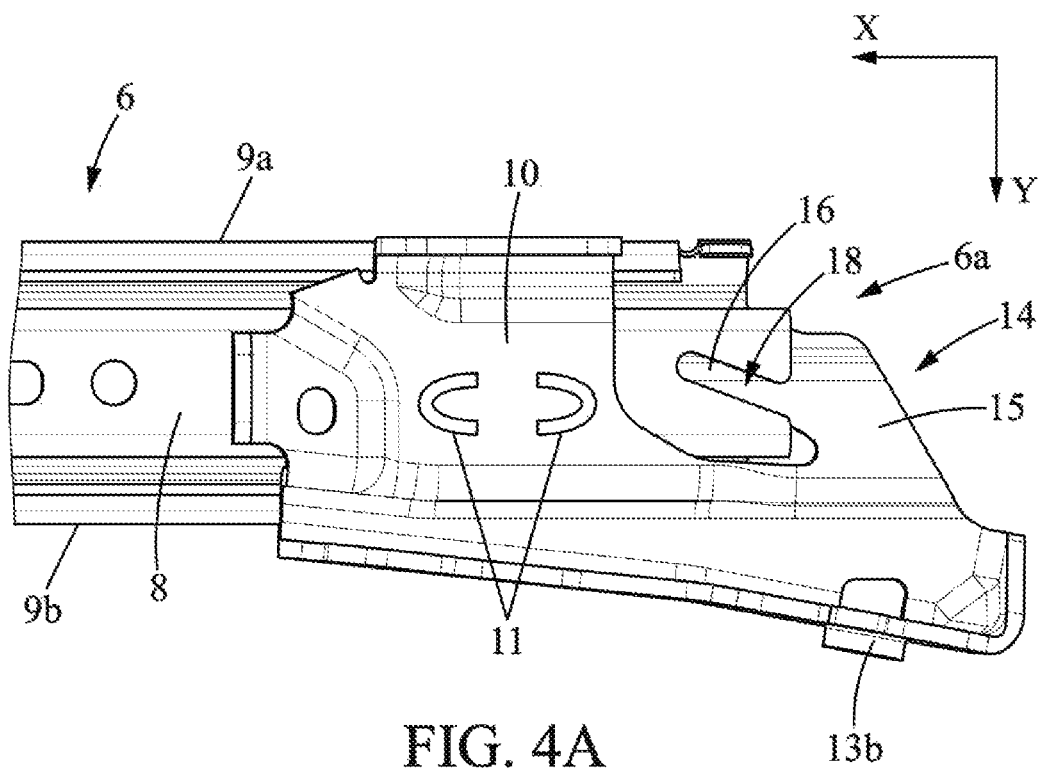
FIG. 4A is a partial top view of the system from FIG. 2 and FIG. 3.

More specifically, the holding part 10 is fixed to the main surface 8 of the mobile profile 6 by one or more laser welds 11, shown in FIG. 4A.

The attachments by laser weld can be of the type between leather and flesh or any other type of weld. When it is applicable, the laser welds can also be replaced by or accompanied by attachments by adhesive, clamping, crimping, riveting or any other attachment means known to the person skilled in the art.

The support 5 also comprises the lateral wings 12a, 12b.

The two lateral wings 12a, 12b of the support 5 are arranged facing each other relative to the holding part 10 along the transverse direction Y.

The two lateral wings 12a, 12b are substantially parallel to each other.

The two lateral wings 12a, 12b each extend in the vertical plane XZ perpendicular to the transverse direction Y.

The lateral wings 12a, 12b are provided with one or more holes 13a, 13b allowing the attachment of one or more pieces of equipment. A hole 13a for example allows fixing the seat cushion 3 of the seat 1 directly or via a height adjustment device. The end of the seatbelt (not shown) can for example be fixed with a hole 13b.

As shown more specifically on FIG. 4A, the attachment holes 13a, 13b can be longitudinally and/or transversely offset relative to the end 6a of the mobile profile 6.

In particular, the two lateral wings 12a, 12b may be offset along the longitudinal direction X, including a first wing 12a positioned, along the longitudinal direction X, covering the mobile profile 6 and a second wing, positioned, along the longitudinal direction X, in particular cantilevered relative to the end 6a of the mobile profile configured for engaging with an engaging part 14.

In such a case, the hole 13b in the second wing 12b is itself cantilevered along the longitudinal direction X relative to the mobile profile 6, and in particular cantilevered relative to the end 6a. The position of this hole 13b is may be advantageous since it provides a lower clearance (along the plane YZ) not limited by the presence of the mobile profile, and unlike comparative structures, thus provides better mounting possibilities.

The support 5 also comprises the engaging part 14, configured for engaging the support 5 with the mobile profile 6 in case of impact of the vehicle.

Figure 5:
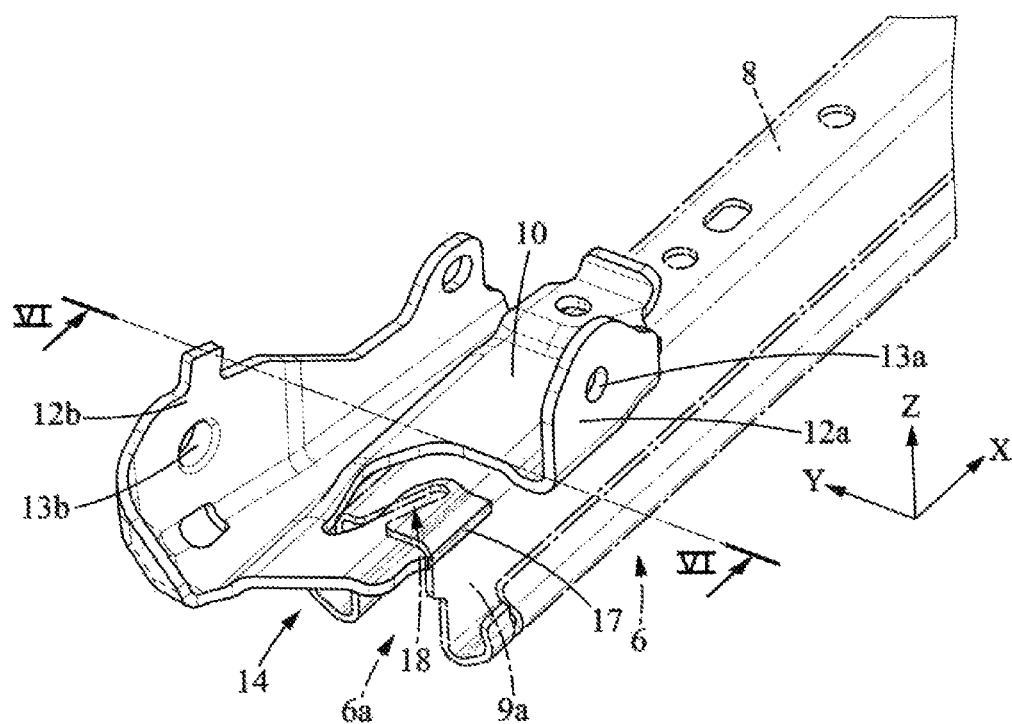
FIG. 5 is a partial perspective view of the system from FIG. 2 and FIG. 3.

The engaging part 14 can be connected to the holding part 10 or to one of the lateral wings 12a, 12b of the support 5, as shown for example in FIG. 5.

Figure 6:
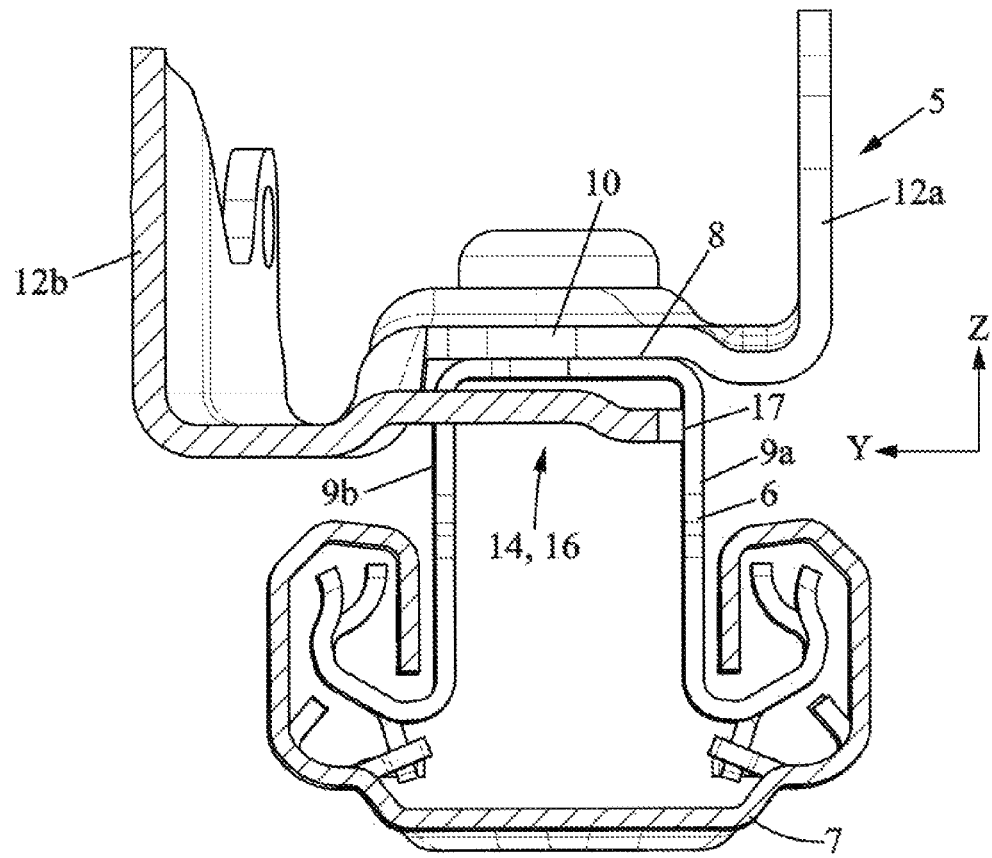
FIG. 6 is a section view of the system from FIG. 2 along the section plane VI-VI from FIG. 5.

The engaging part 14 extends for example along the horizontal plane XY, perpendicular to the vertical direction Z, as shown in FIG. 5 and FIG. 6.

The engaging part 14 has a hook shape in the horizontal plane XY. Thus, the engaging part 14 comprises a first part 15 extending substantially in the transverse direction Y, and a second part 16 connected to the first part 15, extending substantially in the longitudinal direction X.

The engaging part 14 is inserted in the mobile profile 6.

Figure 4B:
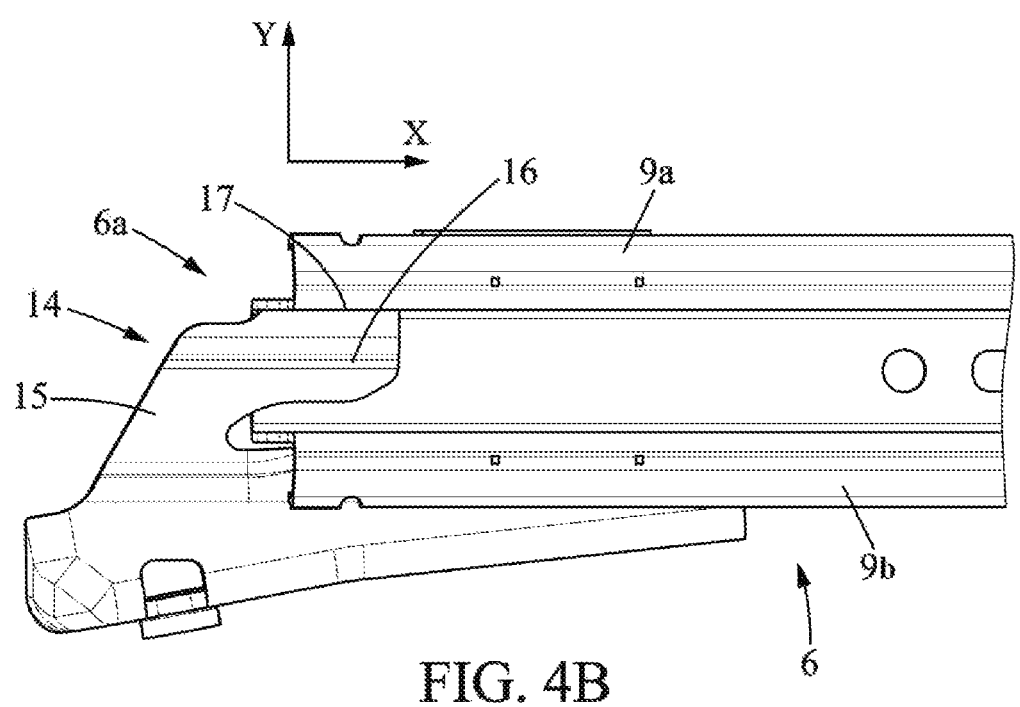
FIG. 4B is a partial bottom view of the system from FIG. 2 and FIG. 3.

More specifically, the engaging part 14 is inserted at the level of one of the ends 6a, 6b of the mobile profile 6. The engaging part 14, in particular the second part 16 thereof, is then located underneath the main surface 8 of the mobile profile 6, as for example shown in FIG. 4B and FIG. 5 (with the mobile profile 6 being shown in dot-dashed line on FIG. 5).

"Underneath the main surface 8 of the mobile profile 6" is understood to mean the engaging part 14 is located towards the bottom relative to the main surface 8 and the vertical direction Z.

The engaging part 14 is arranged facing, in particular parallel, the main surface 8 of the mobile profile 6.

The engaging part 14 and the holding part 10 are then arranged, at least partially, on each side of the main surface 8 of the mobile profile 6.

The engaging part 14, in particular the second part 16 thereof, comprises an end part 17. The end part 17, can be longer or shorter, extending for example along the longitudinal direction X.

The end part 17 is fixed, in particular welded, to the mobile profile 6. More specifically, the end part 17 is welded to one of the lateral wings 9a, 9b of the mobile profile 6. As shown more specifically in FIG. 6, the end part 17 is welded to the lateral wing 9a of the mobile profile 6. The weld can be a laser weld (where this term is understood as before).

Figure 5A:
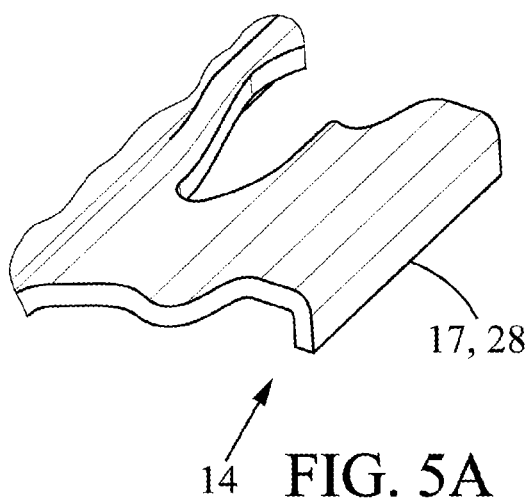
FIG. 5A is a variant of FIG. 5 in which the end part of the engaging part is reinforced by a fold.
Figure 5B:
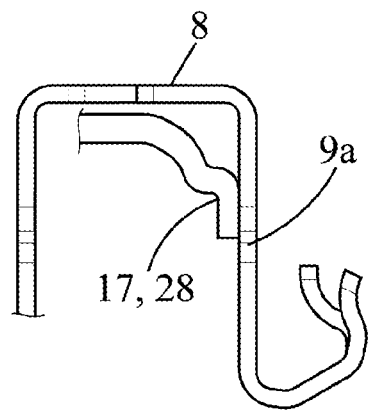
FIG. 5B is a view showing the engaging part from FIG. 5A and the folded end of the end part bearing against the inner surface of the lateral wing to which the end part is fixed by welding.

As shown in FIG. 5A, the end part 17 may comprise a fold 28. This fold 28 serves to strengthen the engaging part 14. The axis of the fold is directed along the longitudinal direction X. The folded end extends substantially along a plane parallel to the lateral wing 9a to which the engaging part 14 is fixed, in particular by welding. The folded end comes to bear against the lateral wing 9a inside the mobile profile 6, as shown in FIG. 5B.

Figure 5C:
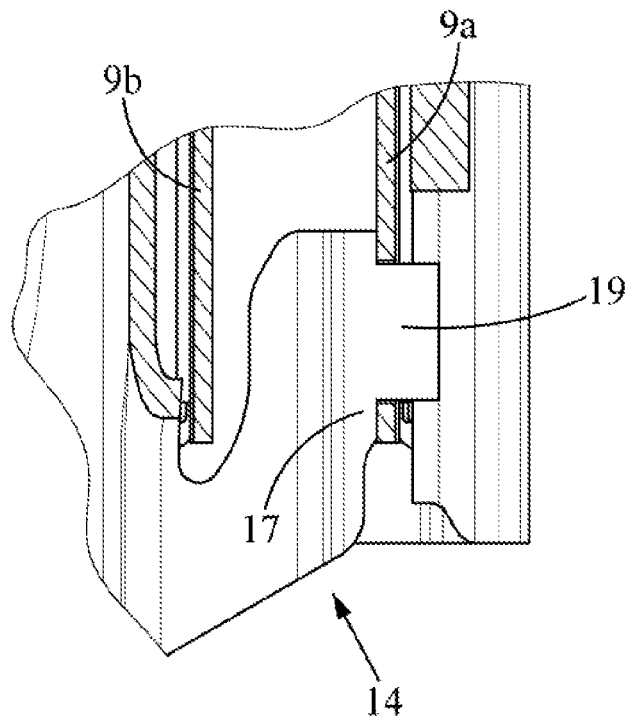
FIG. 5C is a variant of FIG. 5 in which the end part of the engaging part comprises a projecting wing received in a slot of the lateral wing to which the end part is fixed by welding.

As shown in FIG. 5C, the end part 17 may also comprise a projecting wing 19, received in a slot of the mobile part 6. This slot can belong to the lateral wing 9a to which the end part 17 is fixed, in particular by welding. The engagement between the wing 19 and the slot of the profile strengthens the connection between the support 5 and the mobile profile 6.

This wing 19 extends only over a portion of the length of the end part 17, in the longitudinal direction X. The remaining portion of the length of the end part 17 comes to bear against the lateral wing 9a, inside the mobile profile 6.

The first part 15 of the engaging part 14 can be located, along the longitudinal direction X, cantilevered relative to the end 6a of the mobile profile 6.

The support 5 for example made by folding of a single sheet, in particular of metal.

During an impact of the vehicle, a force E could be exerted on the support 5, in particular near an attachment hole 13a, 13b. Such a force E can for example come from the seatbelt associated with the seat 1.

In this possibility, the support 5 can be deformed, in particular elastically, and the hook forming, engaging part 14 could engage with the end 6a of the mobile profile 6.

"Engage" is understood to mean the part of the engaging part 14 comes to stop against the end 6a of the mobile profile 6 in order to keep the support 5 secured to the mobile profile 6. More specifically, the engaging part 14 can engage with the edge of the main surface 8 of the end 6a.

More precisely, the engaging part 14 can be deformed so as to come, at least partially, into the vertical plane XZ and the second part 16 of the engaging part 14 comes to stop against the end 6a of the mobile profile 6. The welds, in particular near the holding part 10 and the end part 17, can be kept in place.

Figure 7:
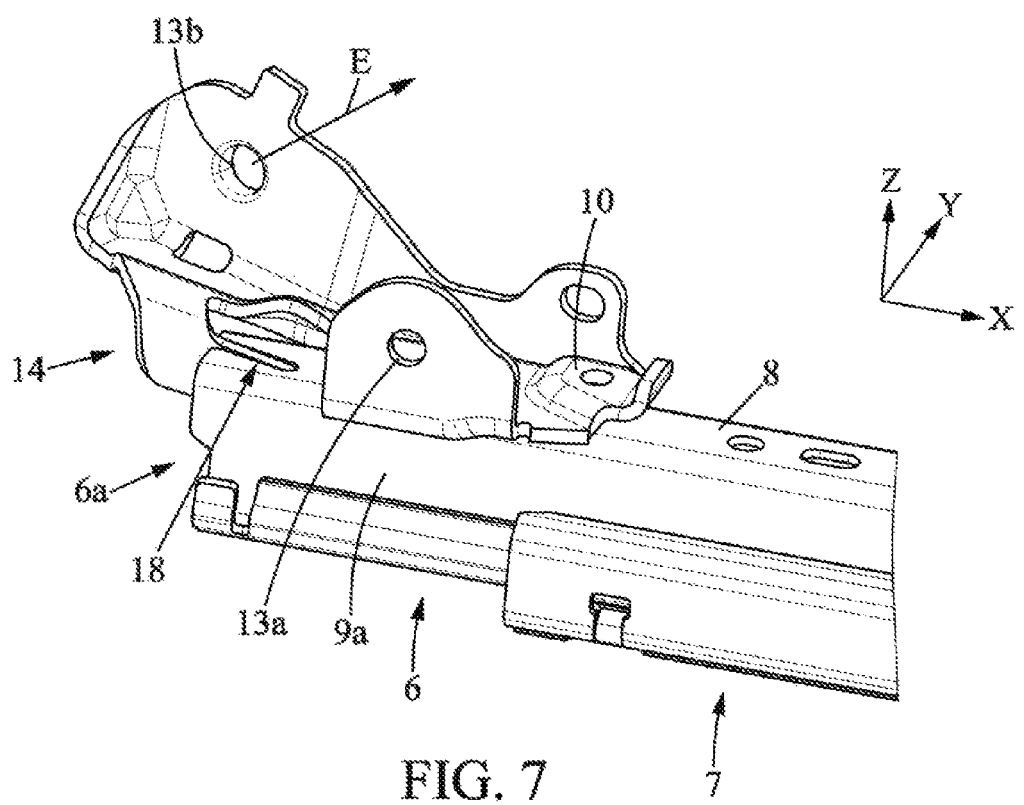
FIG. 7 is a partial perspective view of the system from FIG. 2 and FIG. 3 after a force, illustrated by the arrow E, has been exerted on the support.

According to an implementation, the mobile profile 6 comprises a slot 18 located at the end 6a of the mobile profile 6, shown more specifically on FIG. 5 and FIG. 7. The slot 18 is configured to make the deformation of the engaging part 14 of the support 5 easier in case of impact, in order that the engaging part 14 moves in the vertical plane XZ and forms a hook engaging with the mobile profile 6, in particular with the main surface 8.

Thus the engaging part 14 serves to hold the support part 5 fixed to the mobile profile 6 even when a significant force is exerted on the support 5. The force is thus better distributed over the entire support 5, near the holding part 10 and the engaging part 14.

The laser welds used for fixing the support 5 to the mobile profile 6 are advantageously welds without supply of material. Just the same, other types of welds may be used, in particular for strengthening the attachments of the system, for example MIG-MAG, TIG or CMT type welds.

A comparative system comprises an automotive vehicle seat track and a support. The track comprises a fixed profile, intended to be added onto the chassis of the vehicle, and a mobile profile configured for sliding relative to the fixed profile. The mobile profile has a main surface arranged between two lateral wings each extending in a vertical plane.

The comparative support is added onto the mobile profile for securing the seat to the track. The support comprises a tab which extends in the vertical plane. The main surface of the mobile profile comprises an opening to allow the tab to pass, and the tab is thus fixed to one of the lateral wings of the mobile profile.

The comparative support is intended to subsequently receive, and keep secured to the track, equipment such as the end of the seatbelt or a vehicle seat support frame. It could therefore be subject to significant forces and the present disclosure makes the attachment of the equipment to the vehicle even more robust, in particular when the direction of the force exerted on the equipment can vary.

However, when a significant force is exerted on the support, for example during an impact of the vehicle, the tab of the comparative system might not bear the force exerted and risks tearing free. This is in particular the case when the equipment is fixed to the support offset along the longitudinal direction and/or the transverse direction relative to the mobile profile.

The comparative support comprises two mounting holes, one with which to fix the seatbelt, the other the seat cushion of the seat where the positions of these mounting holes are substantially located near the position of the tab, along the longitudinal direction of the profiles (mobile and fixed).

The longitudinal position of these two comparative holes is not desirable in terms of mounting possibilities, in particular because of the clearance available below the holes which is limited since the mobile profile forms a physical obstacle.

Comparative supports coming to attach in an opening of the mobile profile, away from a free end of the mobile profile, and which could each be made up of an element of a single unit. The available lower clearance under the anchoring points of the comparative support may be limited by the presence of the mobile profile.

A comparative support coming to be fixed in the mobile profile of the track and according to an attachment, requiring that the support be built in two removable parts, respectively positioned above and below the mobile profile, where these two parts are joined by a screw.

The invention claimed is:

1. A system comprising a vehicle seat track, in particular automotive vehicle, and a support, where the track comprises:
   a fixed profile intended to be added onto the chassis of the vehicle; and a mobile profile configured for sliding relative to the fixed profile along a longitudinal direction,
   wherein the mobile profile has a main surface extending along a transverse direction between two lateral wings, the transverse direction is perpendicular to the longitudinal direction, the lateral wings each extend in a vertical plane perpendicular to the transverse direction,
   wherein each profile extends respectively along the longitudinal direction between a first end and a second end,
   wherein the support comprises an engaging part forming a hook, inserted at the level of one of the ends of the mobile profile, made up of the first end or the second end of the mobile profile, where the engaging part is configured for engaging with the end of the mobile profile in case of impact of the vehicle, and
   wherein the engaging part extends in a horizontal plane perpendicular to the vertical direction, the engaging part having a hook shape in the horizontal plane comprising a first part extending substantially in the transverse direction, where the first part is located, along the longitudinal direction, cantilevered relative to the end of the mobile profile configured for engaging with the engaging part; and a second part, connected to the first part, extending substantially in the longitudinal direction, located underneath the main surface of the mobile profile.

2. The system of claim 1, wherein the support comprises a holding part coming into contact with the main surface of the mobile profile.

3. The system of claim 2, wherein the engaging part and the holding part are arranged, at least partially, on each side of the main surface of the mobile profile.

4. The system of claim 2, wherein the holding part is fixed by at least one weld to the main surface of the mobile profile.

5. The system of claim 1, wherein the engaging part comprises an end part fixed by at least one weld to one of the lateral wings of the mobile profile.

6. The system of claim 5, wherein the end part comprises a fold.

7. The system of claim 6, wherein the end part comprises a projecting wing received in a slot of the lateral wing to which the end part is fixed by welding.

8. The system of claim 1, wherein the end of the mobile profile comprises a slot, where the slot is configured for allowing the engaging part to deform in case of impact of the vehicle.

9. The system of claim 8, wherein the slot is made on the main surface of the mobile profile.

10. The system of claim 1, wherein the support comprises two lateral wings allowing the attachment of one or more pieces of equipment for the seat, where the two lateral wings are offset along the longitudinal direction and/or the transverse direction relative to the end of the mobile profile.

11. The system of claim 10, wherein the two lateral wings are offset along the longitudinal direction, including a first wing positioned, along the longitudinal direction, covering the mobile profile and a second wing, positioned, along the longitudinal direction.

12. A seat for an automotive vehicle, comprising the system of claim 1.

13. The seat of claim 12, comprising the system of claim 11, where the first wing comprises a hole configured for fixing the seat cushion of the seat, the second wing, cantilevered, comprises a hole configured for fixing the end of a seatbelt, located cantilevered, along the longitudinal direction relative to the end of the mobile profile configured for engaging with the engaging part.

14. The system of claim 11, wherein the second wing is cantilevered relative to the end of the mobile profile configured for engaging with the holding part.

15. A system comprising a vehicle seat track for an automotive vehicle, and a support, wherein the track comprises:
    a fixed profile configured to be coupled onto a chassis of the vehicle; and a mobile profile configured for sliding relative to the fixed profile along a longitudinal direction,
    wherein the mobile profile has a main surface extending along a transverse direction between two lateral wings, the transverse direction is perpendicular to the longitudinal direction, the lateral wings each extend in a vertical plane perpendicular to the transverse direction,
    wherein each profile extends respectively along the longitudinal direction between a first end and a second end,
    wherein the support comprises an engaging part forming a hook, inserted at the level of one of the ends of the mobile profile, made up of the first end or the second end of the mobile profile, where the engaging part is configured for engaging with the end of the mobile profile in case of impact of the vehicle, and
    wherein the engaging part comprises an end part fixed by at least one weld to one of the lateral wings of the mobile profile.

16. The system of claim 15, wherein the end part comprises a fold.

17. The system of claim 16, wherein the end part comprises a projecting wing received in a slot of the lateral wing to which the end part is fixed by welding.

18. A seat for the automotive vehicle, comprising the system of claim 15.

* * * * *